United States Patent Office 2,869,978
Patented Jan. 20, 1959

2,869,978

METHOD OF GAS PURIFICATION UTILIZING AN AMINE SOLUTION AND AN ANTI-CORROSION AGENT

Paul W. Fischer, Whittier, Calif., assignor to Union Oil Company of California, Los Angeles, Calif., a corporation of California No Drawing. Application September 26, 1955
Serial No. 536,752

8 Claims. (Cl. 23—3)

This invention relates to the prevention of corrosion of ferrous metals in gas-treating systems in which amines, alkanol amines and the like are employed as selective absorbents. It relates to an anti-corrosion agent suitable for use in such systems and to inhibited amine absorbents for the selective removal of acidic constituents from gas mixtures.

The use of aqueous amines and aqueous alkanol amines as selective absorbents for removing carbon dioxide and hydrogen sulfide from hydrocarbon gas mixtures is well known and this process is widely employed in the petroleum and related industries. Generally hydrogen sulfide is removed by treatment in a prior step, as for example by passing the gases over hot iron oxide; however, traces of this gas remain and thus pass through the amine absorber. In this separation process the gas to be purified is contacted with an aqueous solution of aliphatic amine or alkanol amine in an absorption tower in which acidic components of the gas mixtures are selectively removed from the gas mixture. The rich absorbent is passed to a suitable regeneration vessel where it is heated sufficiently to vaporize the dissolved acidic gas, the regenerated absorbent being cooled and returned to the absorption tower for further use. Temperatures in the regeneration vessel may be as high as 280° to 300° F. The absorbents employed are water-soluble aliphatic amines or alkanol amines which are free from carboxyl and carbonyl groups and must boil above about 212° F. The preferred amines are the alkanol amines containing from 2 to 9 carbon atoms, the mono-, di- and tri-ethanol amines being particularly preferred. The absorption solution is an aqueous solution of the amine containing from about 10% to about 50% of the amine.

The above described gas-treating process appears to operate satisfactorily without serious corrosion difficulties when the absorption solution is only partially saturated with carbon dioxide before regeneration, however, this operation is uneconomical and in usual practice the rich absorbent is not regenerated until it has been used to a point nearing its complete capacity to absorb the carbon dioxide. In this case corrosion becomes a particularly serious problem. Even stainless steel is not completely resistant to the corrosion effects in certain parts of the regeneration system. It has been found for example that in a treating unit using an aqueous solution of mono-ethanol amine to recover carbon dioxide from a Santa Maria natural gas, replacement of heat exchanger and regeneration tower portions of the treating system is required after only a few years of operation.

It is an object of this invention to provide an anti-corrosion agent capable of preventing the corrosion of ferrous metals in systems in which organic amines and acidic gases are present.

Another object is to provide an improved process for the removal of acidic gases from gas mixtures.

Another object is to provide an improved process for the purification of natural gas.

A further object is to provide an absorbent suitable for use in processing gas mixtures for the removal of acidic constituents comprising an amine or an alkanol amine and water, which absorbent is relatively non-corrosive with respect to ferrous metals.

Other objects will be apparent from the following description of the invention.

The above and related objects are attained through the use of a particular anti-corrosion agent prepared in a certain manner. The anti-corrosion agent when added to the aliphatic amine or alkanol amine absorbent solution is stable and has the ability to substantially eliminate objectionable corrosion of ferrous metal parts in both the absorption and regeneration units in gas-purifying systems of the type described. The use of absorbents containing the anti-corrosion agent of this invention has been found to be effective in eliminating corrosion even when handling natural gases containing as much as 25% or more of carbon dioxide and using the absorbent solution substantially to exhaustion before regeneration. The anti-corrosion agent is effective in concentrations, based on the aqueous amine absorbent solution, ranging between about 0.05% and about 0.5% or more. Amounts greater than about 0.5% although effective are uneconomical particularly in view of the fact that 0.5% or less gives adequate protection. In operating the gas treating plant it is essential therefore that the concentration of anti-corrosion agent be maintained at a value above about 0.05% based on the aqueous absorbent solution and preferably within the above indicated range and this may be done by intermittent addition of agent to compensate for losses of the active ingredient of the agent.

A typical anti-corrosion agent of this invention is prepared by dissolving 1 part by weight of tartaric acid in 2 to 4 parts by weight of water, adding about 1.4 parts by weight of antimony trichloride and stirring the mixture until a clear solution is obtained. Apparently a complex or coordination compound forms without decomposition of the antimony salt. There is no evidence that insoluble antimony derivatives are formed such as occurs when antimony trichloride is placed in water in the absence of tartaric acid. To the above solution are then added approximately 20 parts of water and approximately 2 parts of a 50% sodium hydroxide solution. Addition of the caustic is carried out with stirring until the solution starts to cloud and then the pH of the solution is adjusted to 3.5 by adding the required amounts of tartaric acid. The described anti-corrosion agent is stable per se and when added to aqueous aliphatic or alkanol amine solutions, such as are used in commercial gas-treating systems, the resulting inhibited absorbent solutions are found to be stable.

As used in this description and in the claims the anti-corrosion agent is the aqueous solution or fine dispersion of an alkali metal salt of the complex or coordination compound formed by reacting tartaric acid or equivalent dibasic acid with an antimony trihalide. Typical compositions will contain about 7% to about 10% of the salt and 93% to 90% of water although the salt content may be varied between about 2% and about 30% and the compositions will be stable and effective as described herein. The proportion of antimony trihalide in the aqueous anti-corrosion agent calculated as antimony will be between about 1.5% and about 3.5% by weight.

In the above composition tartaric acid may be replaced by other similar water soluble hydroxy aliphatic dicarboxylic acids containing 4 or 5 carbon atoms as for example maleic acid, citramaleic acid, etc., and the products will have the ability to prevent corrosion in the indicated systems. However it should be pointed out that the best results are obtained with tartaric acid itself. These acids contain 1 or 2 hydroxyl groups per molecule. In place of antimony trichloride, other antimony halides, particularly antimony tribromide, are found to serve substantially the same purpose. Moreover in place of sodium hydroxide, other metal hydroxides particularly the alkali metal hydroxides such as potassium hydroxide and lithium hydroxide may be employed and the resulting anti-corrosion agents appear to have the same properties and the same ability to prevent corrosion in the systems described as those produced with sodium hydroxide.

In preparing the anti-corrosion agents it is essential that the antimony trihalide be added to a relatively concentrated solution of tartaric or other dibasic acid in water in order to prevent the formation of insoluble antimony derivatives. Once the initial solution or dispersion of the antimony trihalide has been obtained this solution may then be further diluted with water as indicated hereinabove without the formation of insoluble products.

The conversion of dibasic hydroxy acid e. g., the tartaric acid-antimony trihalide composition to its alkali metal salt, as for example sodium salt, is essential in order to produce agents having the desired anti-corrosion properties. Moreover it is essential that in preparing the salt the pH of the final solution be adjusted to a value between about 3.0 and about 4.5, a pH of about 3.5 being particularly preferred. Thus in order to obtain the desired anti-corrosion properties the salt solution must be slightly acid as this pH range would indicate.

In the preferred method of preparing the anti-corrosion agents of this invention 1 part by weight of a water-soluble hydroxy aliphatic dicarboxylic acid having 4 to 5 carbon atoms per molecule is reacted with about 1 to 2 parts by weight of antimony trihalide in the presence of at least about 2 to 4 parts by weight of water. The resulting solution is diluted with additional water to bring the total water content to between about 15 and about 30 parts and then neutralized with about 1.5 to about 2.5 parts by weight of 50% aqueous alkali metal hydroxide, sufficient of the latter being added to give the solution a pH of about 3.5, i. e. between about 3.0 and 4.5. The final adjustment of pH can be made as indicated herein either by adding small amounts of alkali metal hydroxide or small amounts of hydroxy aliphatic dicarboxylic acid, whichever is indicated to be necessary. All of the above reactions take place rapidly at ordinary temperatures and heating is therefore not required.

It is to be noted that it is possible to prepare the anti-corrosition agent by reacting the dicarboxylic acid, antimony trihalide and alkali metal hydroxide in all or a substantial proportion of the total water indicated to be desirable, however it is observed that cloudiness occurs and the reaction takes a substantial amount of time to give a reasonably clear solution. When the reactants are all added at one time or when the alkali metal hydroxide is added before the antimony trihalide a white precipitate is formed that dissolves slowly even after the pH has been brought into the correct range. The product obtained in this manner, although more difficult to prepare appears to have properties equal to those of the products prepared following the preferred method. It is apparent therefore that the anti-corrosion agent consists of the aqueous solution of the reaction product obtained by reacting the dicarboxylic acid, antimony trihalide and alkali metal hydroxide in the presence of water to give a product having a pH between about 3 and about 4.5.

The above described anti-corrosition agent is effective in preventing corrosion in gas-treating plants used for treating gases containing acidic gases, particularly carbon dioxide. However when relatively high proportions of hydrogen sulfide are present a modified anti-corrosion agent such as described herebelow is found to have improved anti-corrosion properties. This modified agent is effective whether or not sulfides such as hydrogen sulfide are present but, as indicated, its particular value is in the treatment of gases containing appreciable concentrations of hydrogen sulfide.

The modified anti-corrosion agent is prepared by adding a relatively high-boiling alkyl pyridine to the above-described anti-corrosion agent. The amount of alkyl pyridine or other cyclic nitrogen compound, as will be described later, will preferably be between about 0.05 and about 1.0% by weight of the anti-corrosion agent used. It is to be noted that the alkyl pyridine may be a single compound or it may be a mixture of related alkyl pyridines of about the same molecular weight or boiling point. Mixtures of alkyl pyridines are presently commercially available. One product that has been found to be particularly satisfactory consists of mixtures of alkyl pyridines containing more than about 2 carbon atoms in alkyl substituents per pyridine group. Other alkyl pyridines which may be used are the alpha, beta and gamma collidines. In addition to the mentioned alkyl pyridines, alkyl-substituted quinolines and piperidines may be employed and these compounds appear to have the ability to stabilize the anti-corrosion agent in the presence of even relatively large amounts of hydrogen sulfide. In selecting the alkyl pyridine or other cyclic nitrogen compound it is desirable that the one selected have a boiling point above about 280° F. and preferably above 300° F. at ordinary pressures.

It is to be understood that the alkyl pyridine or other alkyl substituted quinoline or piperidine may be added to the anti-corrosion agent as indicated but it is preferably added directly to the absorbent solution before or after adding the anti-corrosion agent solution. It is effective in extending the life of the antimony tartrate salt regardless of when it is added. When added directly to the absorbent solution it will be added in amounts ranging from about 0.0005% to 0.005%, based on the absorbent solution.

Further, it is to be understood that the anti-corrosion agent may be added to the absorbent solution and as the use of the so treated absorbent is continued it may be necessary to add more of the agent to maintain at least about 0.05% of the agent at all times. This corresponds to an antimony content of 0.001% based on the absorbent solution. Preferably the antimony content of the absorbent solution will be maintained between about 0.001% and about 0.01% although greater proportions such as up to about 0.05% may be used.

Where relatively high proportions of sulfide ions are present there may be rather high losses of atimony due to antimony sulfide formation. In such cases the continued addition of anti-corrosion agent can be used; however the use of alkyl pyridine, etc. appears to greatly reduce or prevent such losses.

In testing the anti-corrosion agents for their effectiveness against corrosion in amine absorbent solutions, tests have been run in the laboratory and in commercial gas treating units. In each instance test specimens consisting of mild steel rods one-half inch in diameter by six inches long were used. The specimens are prepared by first polishing with emery, washing, drying and rinsing with acetone. The prepared specimens are then weighed and placed in the regenerating section of a commercial gas treating unit so that they are completely immersed in liquid or placed in laboratory test equipment which will be described later. Following a definite period of exposure the specimens are removed, wiped dry with a cloth and washed with acetone. The exposed specimens are then weighed and by comparison with the original weight, the loss in weight is determined, the loss being an indication of the corrosivity of the absorbent solution in which the test was run.

In the laboratory the specimens are placed in an autoclave containing the absorbent solution to be tested at a temperature of 275–280° F. and a pressure of approximately 50 pounds per square inch for a period of 24 hours.

The following examples will illustrate typical anti-corrosion agents of this invention and the effectiveness of these agents in preventing corrosion when added to typical amine type absorbent solutions used in gas treating. In the examples all proportions, unless otherwise indicated, are given as parts by weight.

It should be pointed out that although in the following examples the anti-corrosion agents are referred to as "aqueous sodium antimony tartrate," etc., the exact composition of the active ingredient is not known and the only way these compositions can be accurately defined is by their method of preparation. Thus the terms "sodium antimony tartrate," "potassium antimony tartrate" etc. refer to the products obtained by reacting, in aqueous solution, tartaric acid and antimony trihalide and then further reacting this product with sodium hydroxide, potassium hydroxide, etc.

EXAMPLE I

An aqueous antimony tartrate solution is prepared as described below. To 15 parts of tartaric acid dissolved in 47 parts of water is added 21 parts of antimony trichloride. This mixture is stirred at ordinary temperatures until the antimony trichloride is dissolved. The resulting clear solution is then diluted with 300 parts of water.

Anti-corrosion agents are prepared from the above solution of antimony tartrate by treatment with alkali metal hydroxides as described in subsequent examples.

EXAMPLE II

To 38.3 parts by weight of the antimony tartrate solution described in Example I is added 3 parts of 50% aqueous NaOH solution. The latter is added slowly and when the indicated amount has been added the solution starts to cloud. Sufficient aqueous tartaric acid solution is then added to adjust the pH of the resulting sodium antimony tartrate solution to 3.5 to produce the stable anti-corrosion agent.

EXAMPLE III

The potassium salt of antimony tartrate is prepared following the procedure indicated in Example II for sodium. In this case 4.2 parts of 50% KOH solution is used in place of the 3 parts of NaOH solution. This product is a good anti-corrosion agent for use in aqueous amine type absorbents.

EXAMPLE IV

The lithium salt of antimony tartrate is prepared by following the procedure outlined for the sodium salt in Example II except that sodium hydroxide is replaced by the chemical equivalent amount of lithium hydroxide. The resulting product is a good anti-corrosion agent useful for the purposes described herein.

EXAMPLE V

For purposes of comparison with the alkali metal salts of Examples II, III and IV, a non-metal salt is prepared as follows:

To 38.3 parts of the antimony tartrate solution prepared as described in this example is added 2.04 parts of monoethanolamine. The mixture is stirred at ordinary temperatures for approximately 10 minutes. The resulting product is an aqueous ethanol-amine antimony tartrate solution.

EXAMPLE VI

The results of corrosion tests carried out on absorbent solutions containing the anti-corrosion agents of Examples II, III and IV, and for comparison on the absorbent solution itself and on absorbent solution containing products of Examples I and V are given in Table I. The absorbent solution used in these tests consists of a 25% aqueous solution of monoethanolamine which has been saturated with carbon dioxide gas. This corresponds to a rich absorbent solution. To this solution is added the desired amount of anti-corrosion agent. The rich absorbent solution with and without added anti-corrosion agent to be tested is placed in an autoclave along with the test specimens and maintained at 50 pounds pressure and 275 to 280° F. for 24 hours. The following table shows the total loss in weight of two test specimens in this test.

Table I

| No. | Absorbent Solution Composition | Total Loss in Weight of Two Specimens, mgs. |
| --- | --- | --- |
| 1 | Absorbent Solution (Blank) | 626. |
| 2 | No. 1+0.26% Aqueous Sodium Antimony Tartrate from Example II. | 28. |
| 3 | No. 1+0.026% Aqueous Sodium Antimony Tartrate from Example II. | Less than 50. |
| 4 | No. 1+0.26% Aqueous Potassium Antimony Tartrate from Example III. | Do. |
| 5 | No. 1+0.26% Aqueous Lithium Antimony Tartrate from Example IV. | Do. |
| 6 | No. 1+0.26% Aqueous Antimony Tartrate from Example I. | More than 1,300. |
| 7 | No. 1+0.26% Aqueous Amine Antimony Tartrate from Example V. | 1394. |
| 8 | No. 1+0.026% Aqueous Amine Antimony Tartrate from Example V. | 584. |

EXAMPLE VII

Test specimens placed in the liquid in the regeneration section of a gas treating unit in which the absorbent is a 26% aqueous solution of monoethanolamine and the gas being treated is a natural gas containing 12% $CO_2$ and 0.2 gram/gel. of $H_2S$ show a total weight loss of two specimens of 1062 mg. after 14 days. In comparison, when 0.26% by weight of the product of Example II is added to the described absorbent solution and operations continued with the same gas the corresponding weight loss after 14 weeks is 1.4 mg.

EXAMPLE VIII

Ten parts of the sodium antimony tartrate solution of Example II and 5 parts of a commercial alkyl pyridine consisting of a mixture of alkyl pyridines having above about 3 carbon atoms in alkyl groups, added to 3800 parts of a 25% monoethanolamine absorbent solution was an absorbent which prevents corrosion of ferrous metals when operating on gases containing sulfides. Table II shows the results of comparative tests on the absorbent containing sulfides, and on the sulfide containing absorbent containing aqueous sodium antimony tartrate of Example II with and without the use of alkyl pyridine. The tests were made as described in Example VI.

Table II

| No. | Absorbent Solution Composition | Total Loss in Weight of Two Specimens, Mg. |
| --- | --- | --- |
| 1 | Absorbent+0.2% Sodium Sulfide | 1,200 |
| 2 | No. 1+0.2% Sodium Antimony Tartrate from Example II. | 799 |
| 3 | No. 2+0.5% Alkyl Pyridine from Example VIII. | 3.9 |

EXAMPLE IX

Example VIII repeated using methyl quinoline in place of the alkyl pyridines gives results similar to those for alkyl pyridines.

EXAMPLE X

Absorbent solutions consisting of aqueous solutions containing 20% of diethanolamine are inhibited in the same manner and substantially to the same extent as the monoethanolamine absorbents used in the preceding examples. The results are similar both in the presence and absence of alkyl pyridines and alkyl quinolines.

Other modes of applying the principle of my invention may be employed instead of those explained, change be-

I claim:

1. In a process for separating acidic gases of the class consisting of carbon dioxide and hydrogen sulfide from a gas mixture wherein said mixture is contacted with an absorbent comprising an aqueous solution of a compound selected from the class consisting of water-soluble aliphatic amines and alkanolamines which are free from carboxyl and carbonyl groups and which boil above about 212° F., the improvement which consists in adding to said absorbent between about 0.05% and about 0.5% of the product obtained by reacting one part by weight of a water-soluble hydroxy aliphatic dicarboxylic acid having 4 to 5 carbon atoms per molecule with between about 1 and about 2 parts by weight of antimony trihalide and sufficient alkali metal hydroxide to produce a product having a pH of between about 3.0 and 4.5, said reaction being effected in the presence of between about 15 and about 30 parts by weight of water.

2. In a process for separating acidic gases of the class consisting of carbon dioxide and hydrogen sulfide from a gas mixture wherein said mixture is contacted with an absorbent comprising an aqueous solution of a compound selected from the class consisting of water-soluble aliphatic amines and alkanolamines which are free from carboxyl and carbonyl groups and which boil above about 212° F., the improvement which consists in adding to said absorbent between about 0.05% and about 0.5% of the product obtained by reacting one part by weight of a water-soluble hydroxy aliphatic dicarboxylic acid having 4 to 5 carbon atoms with between about 1 and about 2 parts by weight of antimony trihalide in the presence of at least about 2 to 4 parts by weight of water, diluting the resulting aqueous solution to bring the total water content to between about 15 and about 30 parts by weight and adding sufficient alkali metal hydroxide to give the resulting solution a pH between about 3.0 and about 4.5.

3. The process according to claim 2 in which said dicarboxylic acid is tartaric acid.

4. The process according to claim 2 in which said antimony trihalide is antimony trichloride and said alkali metal hydroxide is sodium hydroxide.

5. In a process for separating acidic gases of the class consisting of carbon dioxide and hydrogen sulfide from a gas mixture wherein said mixture is contacted with an absorbent comprising an aqueous solution of a compound selected from the class consisting of water-soluble aliphatic amines and alkanolamines which are free from carboxyl and carbonyl groups and which boil above about 212° F., the improvement which consists in adding to said absorbent between about 0.05% and about 0.5% of the product obtained by reacting 1 part by weight of tartaric acid with about 1.4 parts by weight of antimony trichloride in the presence of at least 2 to 4 parts by weight of water, further diluting the resultant solution with sufficient water to give a total water content between about 22 and about 24 parts by weight and neutralizing the resultant product with sodium hydroxide to produce a solution having a pH of approximately 3.5.

6. In a process for separating acidic gases of the class consisting of carbon dioxide and hydrogen sulfide from a gas mixture wherein said mixture is contacted with an absorbent comprising an aqueous solution of a compound selected from the class consisting of water-soluble aliphatic amines and alkanolamines which are free from carboxyl and carbonyl groups and which boil above about 212° F., the improvement which consists in adding to said absorbent (1) between about 0.00005% and about 0.005% of a cyclic nitrogen compound selected from the class consisting of alkyl pyridines, alkyl quinolines and alkyl piperidines and (2) between about 0.05% and about 0.5% of the product obtained by reacting one part by weight of a water-soluble hydroxy aliphatic dicarboxylic acid having 4 to 5 carbon atoms with between about 1 and about 2 parts by weight of antimony trihalide in the presence of at least about 2 to 4 parts by weight of water, diluting the resulting aqueous solution to bring the total water content to between about 15 and about 30 parts by weight and adding sufficient alkali metal hydroxide to give the resulting solution a pH between about 3.0 and about 4.5.

7. In a process for separating acidic gases of the class consisting of carbon dioxide and hydrogen sulfide from a gas mixture wherein said mixture is contacted with an absorbent comprising an aqueous solution of a compound selected from the class consisting of water-soluble aliphatic amines and alkanolamines which are free from carboxyl and carbonyl groups and which boil above about 212° F., the improvement which consists in adding to said absorbent an anti-corrosion agent prepared by reacting one part by weight of a water-soluble hydroxy aliphatic dicarboxylic acid having 4 to 5 carbon atoms with between about 1 and about 2 parts by weight of antimony trihalide in the presence of at least about 2 to 4 parts by weight of water, diluting the resulting aqueous solution to bring the total water content to between about 15 and about 30 parts by weight and adding sufficient alkali metal hydroxide to give the resulting solution a pH between about 3.0 and about 4.5, said anti-corrosion agent being added in an amount sufficient to maintain an antimony content in said absorbent of between about 0.001% and about 0.05%.

8. In a process for separating acidic gases of the class consisting of carbon dioxide and hydrogen sulfide from a gas mixture wherein said mixture is contacted with an absorbent comprising an aqueous solution of a compound selected from the class consisting of water-soluble aliphatic amines and alkanolamines which are free from carboxyl and carbonyl groups and which boil above about 212° F., the improvement which consists in adding to said absorbent (1) between about 0.00005% and about 0.005% of a cyclic nitrogen compound selected from the class consisting of alkyl pyridines, alkyl quinolines and alkyl piperidines and (2) anti-corrosion agent prepared by reacting one part by weight of a water-soluble hydroxy aliphatic dicarboxylic acid having 4 to 5 carbon atoms with between about 1 and about 2 parts by weight of antimony trihalide in the presence of at least about 2 to 4 parts by weight of water, diluting the resulting aqueous solution to bring the total water content to between about 15 and about 30 parts by weight and adding sufficient alkali metal hydroxide to give the resulting solution a pH between about 3.0 and about 4.5, said anti-corrosion agent being added in an amount sufficient to maintain an antimony content in said absorbent of between about 0.001% and about 0.05%.

References Cited in the file of this patent

UNITED STATES PATENTS

| | | |
|---|---|---|
| 1,915,148 | Berliner et al. | June 20, 1933 |
| 1,964,696 | Traube et al. | June 26, 1934 |
| 2,031,632 | Bottoms | Feb. 25, 1936 |
| 2,066,742 | Schmidt | Jan. 5, 1937 |
| 2,472,400 | Bond et al. | June 7, 1949 |
| 2,473,735 | Solomon | June 21, 1949 |